US010203981B2

(12) United States Patent
Little

(10) Patent No.: US 10,203,981 B2
(45) Date of Patent: Feb. 12, 2019

(54) SYSTEMS AND METHODS FOR PREPARE LIST COMMUNICATION TO PARTICIPANTS IN TWO-PHASE COMMIT PROTOCOL TRANSACTION PROCESSING

(71) Applicant: Red Hat, Inc., Raleigh, NC (US)

(72) Inventor: Mark Little, Ebchester (GB)

(73) Assignee: RED HAT, INC., Raleigh, NC (US)

( * ) Notice: Subject to any disclaimer, the term of this patent is extended or adjusted under 35 U.S.C. 154(b) by 602 days.

(21) Appl. No.: 14/193,802

(22) Filed: Feb. 28, 2014

(65) Prior Publication Data

US 2015/0248309 A1 Sep. 3, 2015

(51) Int. Cl.
*G06F 9/46* (2006.01)
*G06F 17/30* (2006.01)
*H04L 29/08* (2006.01)

(52) U.S. Cl.
CPC ........ *G06F 9/466* (2013.01); *G06F 17/30371* (2013.01); *H04L 67/10* (2013.01)

(58) Field of Classification Search
CPC ............... G06F 17/30008; G06F 9/466; G06F 17/30286
USPC ........................................................ 707/703
See application file for complete search history.

(56) References Cited

U.S. PATENT DOCUMENTS

| 7,401,084 | B1 | 7/2008 | Sinha et al. |
| 7,873,604 | B2 | 1/2011 | Little |
| 7,900,085 | B2 | 3/2011 | Little |
| 8,140,623 | B2 | 3/2012 | Fachan |
| 8,234,517 | B2* | 7/2012 | Bamford ........... G06F 17/30575 714/15 |
| 8,442,962 | B2 | 5/2013 | Lee et al. |
| 8,479,044 | B2 | 7/2013 | Dennis et al. |
| 2002/0087366 | A1* | 7/2002 | Collier .................... G06F 9/466 705/5 |

(Continued)

OTHER PUBLICATIONS

Kumar, Vijay, "Mo bile Computing Distributed Transaction Management", Computer Science, http://k.web.umkc.edu/kumarv/cs572/DDBS-T-Manage.pdf. [n/a], University of Missouri—Kansas City, U.S.

(Continued)

*Primary Examiner* — Pierre M Vital
*Assistant Examiner* — Andrew N Ho
(74) *Attorney, Agent, or Firm* — Haynes and Boone, LLP

(57) ABSTRACT

Systems and methods are provided for prepare list communication to participants in a two-phase commit protocol transaction processing. An exemplary method includes receiving a distributed transaction for processing, wherein the processing uses a two-phase commit protocol, preparing a first participating node comprising a first process of the distributed transaction, and preparing a second participating node comprising a second process of the distributed transaction. The method further includes determining whether the first participating node can commit the first process and transmitting the determination the first participating node can commit the first process to the second participating node. The first participating node and the second participating node may determine a coordinator of the distributed transaction has failed and the second participating node may use the determination to query the first participating node for a transaction outcome, such as a commit of fail state.

20 Claims, 5 Drawing Sheets

(56) References Cited

U.S. PATENT DOCUMENTS

| | | | |
|---|---|---|---|
| 2002/0184239 A1* | 12/2002 | Mosher, Jr. | G06F 11/1471 707/999.2 |
| 2004/0148289 A1* | 7/2004 | Bamford | G06F 17/30377 707/10 |
| 2006/0095438 A1* | 5/2006 | Fachan | G06F 17/30227 707/10 |
| 2007/0143299 A1* | 6/2007 | Huras | G06F 9/466 707/999.01 |
| 2007/0168351 A1* | 7/2007 | Fachan | G06F 17/30227 707/999.01 |
| 2008/0250074 A1 | 10/2008 | Parkinson | |
| 2009/0043845 A1 | 2/2009 | Garza et al. | |
| 2009/0113431 A1* | 4/2009 | Whyte | G06F 9/466 718/101 |
| 2009/0217274 A1* | 8/2009 | Corbin | G06F 9/466 718/101 |
| 2009/0292744 A1* | 11/2009 | Matsumura | G06F 9/466 707/999.202 |
| 2011/0022790 A1* | 1/2011 | Fachan | G06F 17/30194 711/104 |
| 2011/0078516 A1* | 3/2011 | El-Kersh | G06F 9/466 714/48 |
| 2012/0011100 A1* | 1/2012 | Yamane | G06F 17/30348 707/649 |

OTHER PUBLICATIONS

Camargos et al., "A Highly Available Log Service for Transaction Termination", http://www.inf.usl.ch/faculty/pedone/Paper/2008/2008ISPDC.pdf, 2008 International Symposium on Parallel and Distributed Computing, IEEE Computer Society, 2008, University of Campinas; University of Lugano.

Samaras et al., "Two-Phase Commit Optimizations in a Commercial Distributed Environment", http://library.riphah.edu.pk/acm/disk_2/text/5-1/DPD/3/P325, Distributed and Parallel Databases, 1995, pp. 325-360, vol. 3.

Alvisi, Lorenzo, "Atomic Commit", Course CS 380D, Week 3 Notes, Aug. 2013 http://www.cs.utexas.edu/users/lorenzo/corsi/cs380d/13F/notes/week3.pdf, University of Texas at Austin.

* cited by examiner

SYSTEMS AND METHODS FOR PREPARE LIST COMMUNICATION TO PARTICIPANTS IN TWO-PHASE COMMIT PROTOCOL TRANSACTION PROCESSING

FIELD OF DISCLOSURE

The present disclosure generally relates to a two-phase commit protocol transaction processing, and more particularly to communicating a prepare list to each network node executing a process of the distributed transaction so the network node can determine a transaction outcome after coordinator failure.

BACKGROUND

A distributed transaction may include a set of processes or operations that may involve the use of more than one network host/resource. For example, a distributed transaction may call for database updates or operations using more than one database. A network host may provide for transaction resources utilized by a process, such as the database that requires updating and/or use. A transaction manager may receive a distributed transaction and prepare participating processes to execute on required network hosts. Thus, the transaction manager may prepare a coordinator network host/node that manages a set of participating network nodes each executing one or more processes of the distributed transaction.

Similar to other transactions, distributed transaction must maintain atomicity, consistency, isolation, and durability properties (ACID properties). Atomicity requires that changes made during processing a transaction are atomic, either all the changes to a database during an operation or update occur or they all do not occur. This prevents database updates from partially occurring, which would affect the reliability and consistency of databases. Thus, in the case of a system failure or a failure of a particular network host, the other network hosts executing their participating processes may not know the results of the transaction during recovery. Thus, these other network hosts may wait in a "ready to commit" state or keep a transaction resource locked until the failed network host can be contacted.

BRIEF SUMMARY

This disclosure relates to distributed transaction processing systems and two-phase commit protocol transaction processing. Methods, systems, and techniques for communicating a prepare list of participating network nodes to each participating network node to enable the participating network nodes to inquire as to the outcome of a distributed transaction during recovery are provided According to an embodiment, a method for distributed transaction processing includes receiving a distributed transaction for processing, wherein the processing uses a two-phase commit protocol, preparing a first participating node comprising a first process of the distributed transaction, and preparing a second participating node comprising a second process of the distributed transaction. The method further includes determining whether the first participating node can commit the first process and transmitting, using one or more hardware processors, the determination the first participating node can commit the first process to the second participating node.

According to another embodiment, a system for distributed transaction processing includes a coordinator network node that receives a distributed transaction for processing, wherein the processing uses a two-phase commit protocol, a first participating network node coupled to the coordinator network node that determines whether the first participating network node can commit a first process of the distributed transaction, and transmits a determination that the first participating network node can commit the first process, and a second participating network node coupled to the coordinator network node that receives the determination.

According to another embodiment, a non-transitory computer readable medium comprising a plurality of machine-readable instructions which when executed by one or more processors of a server are adapted to cause the server to perform a method comprising receiving a distributed transaction for processing, wherein the processing uses a two-phase commit protocol, preparing a first participating node comprising a first process of the distributed transaction, and preparing a second participating node comprising a second process of the distributed transaction. The method further includes determining whether the first participating node can commit the first process and transmitting the determination the first participating node can commit the first process to the second participating node.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
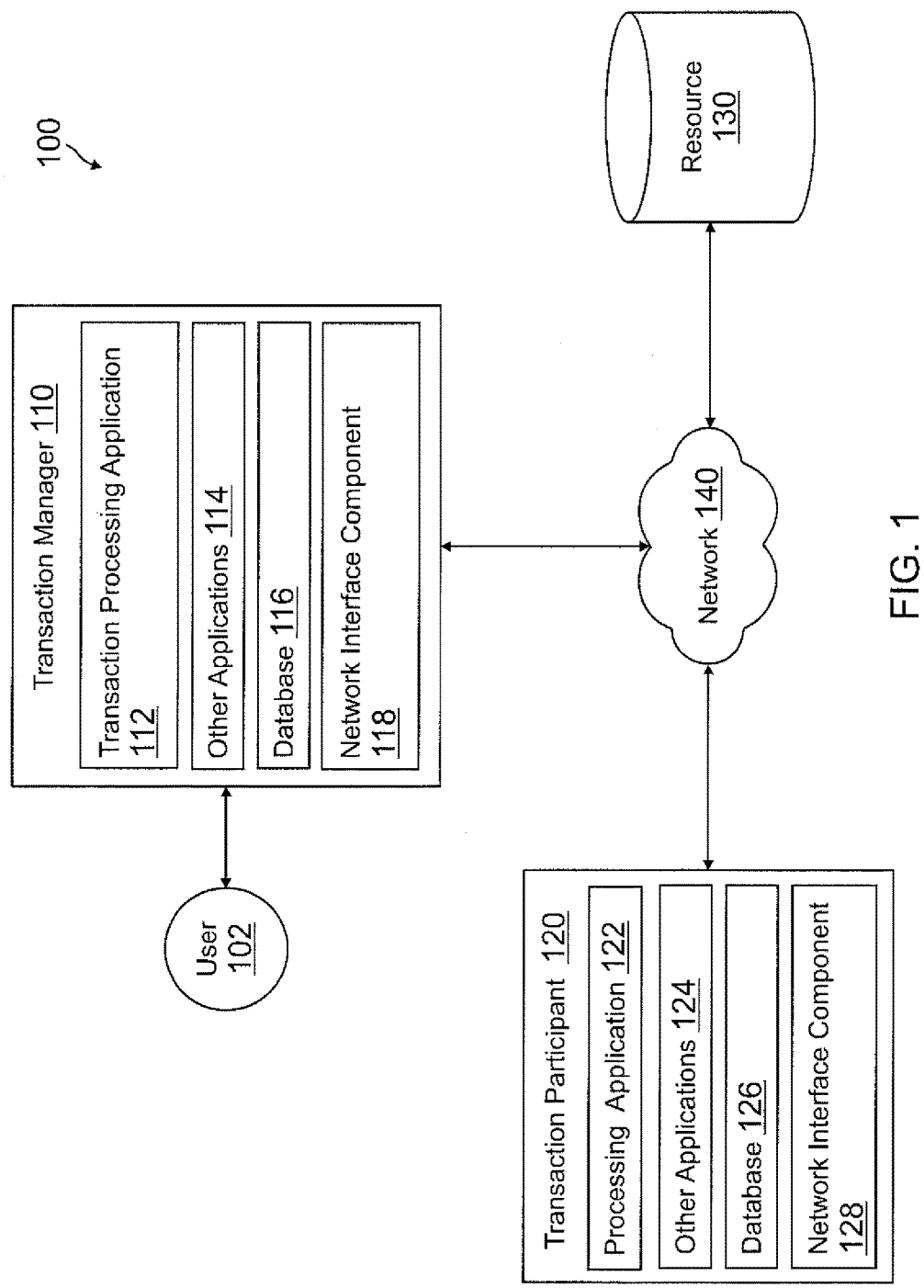
FIG. 1 is a simplified block diagram of an exemplary system for communicating a prepare list to participants in a two-phase commit protocol transaction processing, according to an embodiment.

FIG. 1 is a simplified block diagram of an exemplary system for communicating a prepare list to participants in a two-phase commit protocol transaction processing, according to an embodiment. Terms like "machine," "device," "computer," and "computing system" are used interchangeably and synonymously throughout this document. System 100 may include a server computing system or a client computing system.

FIG. 1 is a block diagram of a networked system 100 suitable for implementing the processes described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, an APPLE® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client 102, a transaction manager 110, a transaction participant 120, and a resource 130 in communication over a network 140. Client 102, transaction manager 110, transaction participant 120, and resource 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

In FIG. 1, client 102 may submit a distributed transaction for processing to transaction manager 110, such as a transaction having processes requiring the use of resource 130. Transaction manager 110 may establish one or more transaction participants 120 to execute the processes of the distributed transaction. Transaction participants 120 may utilize resource 130 to complete the processes. Client 102 may be implemented using any appropriate hardware and software configured for wired and/or wireless communication with transaction manager 110. For example, in one embodiment, client 102 may be implemented as a personal computer (PC), a smart phone, personal digital assistant (PDA), laptop computer, tablet computer and/or other types of computing devices capable of transmitting and/or receiving data. Although a client is shown, the client may be managed or controlled by any suitable processing device. Although only one client is shown, a plurality of clients may be utilized.

Transaction manager 110 may be implemented using any appropriate hardware and software configured for wired and/or wireless communication with transaction participant 120 and resource 130 over network 140. For example, in one embodiment, transaction manager 110 may be implemented as a personal computer (PC), a smart phone, personal digital assistant (PDA), laptop computer, tablet computer and/or other types of computing devices capable of transmitting and/or receiving data. Although a transaction manager is shown, the transaction manager may be managed or controlled by any suitable processing device.

Transaction manager 110 may utilize one or more applications to process a distributed transaction, where the applications may utilize a two-phase commit protocol (2PC) to process the distributed transaction. In this regard, transaction manager 110 contains a transaction processing application 112, other applications 114, a database 116, and a network interface component 118. Transaction processing application 112 and other applications 114 may correspond to processes, procedures, and/or applications executable by a hardware processor, for example, a software program. In other embodiments, transaction manager 110 may include additional or different software as required.

Transaction processing application 112 may be implemented as an application configured to provide distributed transaction processing to client 102. Client 102 may transmit a distributed transaction to transaction manager 110 for processing. Transaction processing application 112 may receive and process the distributed transaction by determining the processes of the distributed transaction and establishing participating network nodes to execute the processes of the distributed transaction. In this regard, transaction processing application 112 may establish transaction participant 120, which may perform a process on resource 130. A process may correspond to a database update/use that changes (e.g., adds, alters, or deletes) data stored on the database. As database transactions often require the use of multiple databases, multiple transaction participants 120 may be established, each operating on one or more resource 130.

Transaction processing application 112 may utilize a two-phase commit (2PC) protocol to determine whether each of the established transaction participants (e.g., transaction participant 120) is ready to execute and commit the respective process on operated-on resource of the transaction participant. 2PC requires a main transaction coordinator to poll the participating nodes to determine whether the processes can commit, or are in a state where the processes have executed correctly and may make the changes to the database (called a voting phase). If every participating node responds that their respective process can commit, then the main coordinator instructs the nodes to commit the process (called a commit phase). If any participating node, responds that the node cannot commit, then the distributed transaction is rolled back so that no changes take place.

Transaction processing application 112 may establish a coordinator that may determine whether each of the transaction participants is ready to commit the process using the resource (e.g., commit the data transformation on the database updated by the process). The transaction participants may execute the process up to the point that the process is ready to commit. Once the transaction participants are ready to commit, the coordinator may poll the transaction participants and the transaction participants may communicate the status (e.g., a ready to commit status) to the coordinator established by transaction processing application 112. If any of the participants fail to prepare the process to a ready to commit point, the coordinator of transaction processing application 112 may inform all of the established transaction participants to roll back and prevent any process from executing and committing the changes to the resource. Transaction processing application 112 may retain a transaction log having the transaction participants, an initial state of each of the transaction participants (e.g., a rollback state), and/or processes taken by each of the transaction participants. The transaction log may be utilized for rollback to an initial state in the event of system failure, failure of a participant, and/or failure of the coordinator.

However, as each transaction participant determines that the transaction participant can prepare, transaction manager 110 receives the determination that the transaction participant can prepare. Thus, when the coordinator of transaction processing application 112 transmits a prepare request to the next transaction participant, the next transaction participant may receive the determination of all previously established transaction participants that are ready to commit their processes. For example, a first prepare request, when no other transaction participants have been established, may be transmitted to a first transaction participant. The first transaction participant may receive only a prepare request including one or more processes and a request to prepare the process on the resource up until a ready to commit state. However, after the first prepare request is processed by the first transaction participant and the first transaction participant is ready to commit the process, a second transaction participant may receive a prepare request that includes one or more processes of the distributed transaction, a request to prepare the process up to a ready to commit state, and identification of the first transaction participant with information that the first transaction participant is ready to commit the process (e.g., a "prepare list"). The prepare list includes a list of all previous transaction participants that are ready to commit. Thus, by the time the coordinator of transaction processing application 112 transmits a last prepare request having the prepare list, the prepare list includes all previous transaction participants that are ready to commit (e.g., if the first transaction participant is 0 and the last transaction participant is N, then the prepare list includes N−1 transaction participants).

During processing of the distributed transaction, transaction manager 110 or the coordinator of transaction manager 110 may fail. Transaction manager 110 may recover and determine the state of the transaction from the transaction participants using the prepare list. Additionally, as will be explained in more detail herein, during recovery each of the transaction participants may contact another participant to determine the transaction outcome. If a transaction participant cannot contact the recovered coordinator of transaction processing application 112, the transaction participant can determine whether to commit using the prepare list. Additionally, the transaction participant may retain and transmit data on the completed and committed processes for transaction manager 110 to receive when transaction manager 110 and the transaction participant are in communication, as will be explained in more detail herein.

Transaction manager 110 includes other applications 114 as may be desired in particular embodiments to provide features to transaction manager 110. For example, other applications 114 may include security applications for implementing security features, programmatic client applications for interfacing with appropriate application programming interfaces (APIs) over network 140, or other types of applications. Other applications 114 may contain software programs, executable by a processor, including a graphical user interface (GUI) configured to provide an interface to a client/user/system administrator.

Transaction manager 110 may further include database 116 which may include, for example, 2PC protocol information, network node information including identifiers, corresponding resources, and/or processing information. Database 116 may include a distributed transaction for processing by transaction manager 110. Database 116 may include information on established transaction participants including a commit state of the corresponding established transaction participant. Information in database 116 may be utilized to establish a prepare list having information on established transaction participants and the transaction participants corresponding commit state. Database 116 may further store prepare list for updating and communication to further transaction participants.

In various embodiments, transaction manager 110 includes at least one network interface component 118 adapted to communicate with transaction participant and resource 130 over network 140. In various embodiments, network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Transaction participant 120 may be implemented using any appropriate hardware and software configured for wired and/or wireless communication with transaction manager 110 and resource 130 over network 140. For example, in one embodiment, transaction participant 120 may be implemented as a personal computer (PC), a smart phone, personal digital assistant (PDA), laptop computer, tablet computer and/or other types of computing devices capable of transmitting and/or receiving data. Although a transaction participant is shown, the transaction participant may be managed or controlled by any suitable processing device. Although only one transaction participant is shown, a plurality of transaction participants may be utilized.

Transaction participant 120 may utilize one or more applications to process a received prepare request having at least one process of a distributed transaction using a two-phase commit protocol application (2PC). In this regard, transaction participant 120 contains a processing application 122, other applications 124, a database 126, and a network interface component 128. Processing application 122 and other applications 124 may correspond to processes, procedures, and/or applications executable by a hardware processor, for example, a software program. In other embodiments, transaction participant 120 may include additional or different software as required.

Processing application 122 may be configured to provide processing of received prepare requests from a main coordinator established by transaction manager 110. In this regard, processing application 122 may receive a prepare request from transaction manager 110. The prepare request may include a process to execute by transaction participant 120. Using a 2PC protocol, processing application 122 may execute the process up until transaction participant 120 is ready to commit the changes to one or more resources (e.g., resource 130). Once transaction participant 120 reaches a "ready to commit" state, transaction participant 120 may respond to a query by transaction manager 110 with information that transaction participant 120 is ready to commit the process to the resource. While executing the process up to a ready to commit state, processing application 122 may retain a transaction log having data corresponding to the coordinator, an initial state of the resource, and processes taken by transaction participant 120. Transaction participant 120 may wait until the coordinator executing on transaction manager 110 notifies the transaction participant to commit before executing the process on the resource (e.g., permanently changing the resource to survive failures and meet the durability requirement of transaction processing). If the transaction participant fails, the coordinator fails, or another issue arises, the transaction log can be used to "rollback" or revert to the initial state.

Processing application 122 may further receive the aforementioned prepare list having a list of all established transaction participants that are in a ready to commit state for their respective processes of a distributed transaction. Processing application 122 may store the prepare list, for example, to database 126. If transaction manager 110 (or the coordinator executing on transaction manager 110, transaction participant 120, and/or another established transaction participant fail, the prepare list may be utilized by transaction participant 120 to inquire as to the outcome of the distributed transaction. Thus, transaction participant 120 may determine whether to commit from other transaction participants within the prepare list. If the other participants are ready to commit, processing application 122 can commit the process using the prepare list without communication with the coordinator, in the event that transaction manager 110 cannot be reached or has not recovered.

If processing application 122 commits the process to the resource using the prepare list and without communication with the coordinator on transaction manager 110, processing application 122 may record the outcome and the execute processes. Thus, information corresponding to the executed process (e.g., the steps, outcome, etc.) may be recorded to database 126 by processing application 122. When transaction manager 110 eventually recovers, processing application 122 may communicate the information to transaction manager 110. Thus, transaction manager 110 is aware that transaction participant 120 committed the processes and a failure did not occur. Therefore atomicity is preserved even when executing a heuristic decision by transaction participant 120 based on the prepare list.

In various embodiments, transaction participant 120 includes other applications 124 as may be desired in particular embodiments to provide features for transaction participant 120. For example, other applications 124 may include security applications for implementing security features, programmatic server applications for interfacing with appropriate application programming interfaces (APIs) over network 140, or other types of applications. Other applications 124 may contain software programs, such as a graphical user interface (GUI), executable by a processor that is configured to provide an interface to the user.

Transaction participant 120 includes database 126, which may be configured to store 2PC protocol information, network node information including identifiers, corresponding resources, and/or processing information. Database 126 may include a distributed transaction processes designated for processing by transaction participant 120. Database 126 may include information on a prepare list having established transaction participants including a commit state of the corresponding established transaction participant. Database 126 may include transaction log information for coordinator, initial state of a resource used by transaction participant 120, completed processes by transaction participant 120 or other information necessary for rollback and roll-forward states.

In various embodiments, transaction participant 120 includes at least one network interface component 128 adapted to communicate with network 140 including transaction manager 110 and/or resource 130. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Resource 130 may correspond to a resource accessible and utilized by transaction manager 110 and/or transaction participant 120 during processing of a distributed transaction. Resource 130 may correspond to a database having data organized and/or stored in data structures that may be searched, altered, and stored. It is understood that resource 130 is exemplary and various embodiments may include a different number of resources as desired. Although resource 130 is shown separate and accessible over network 140 to transaction participant 120, in various embodiments, resource 130 may be local or contained within transaction participant 120.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, for example the various components of system 100 of FIG. 1.

Figure 2:
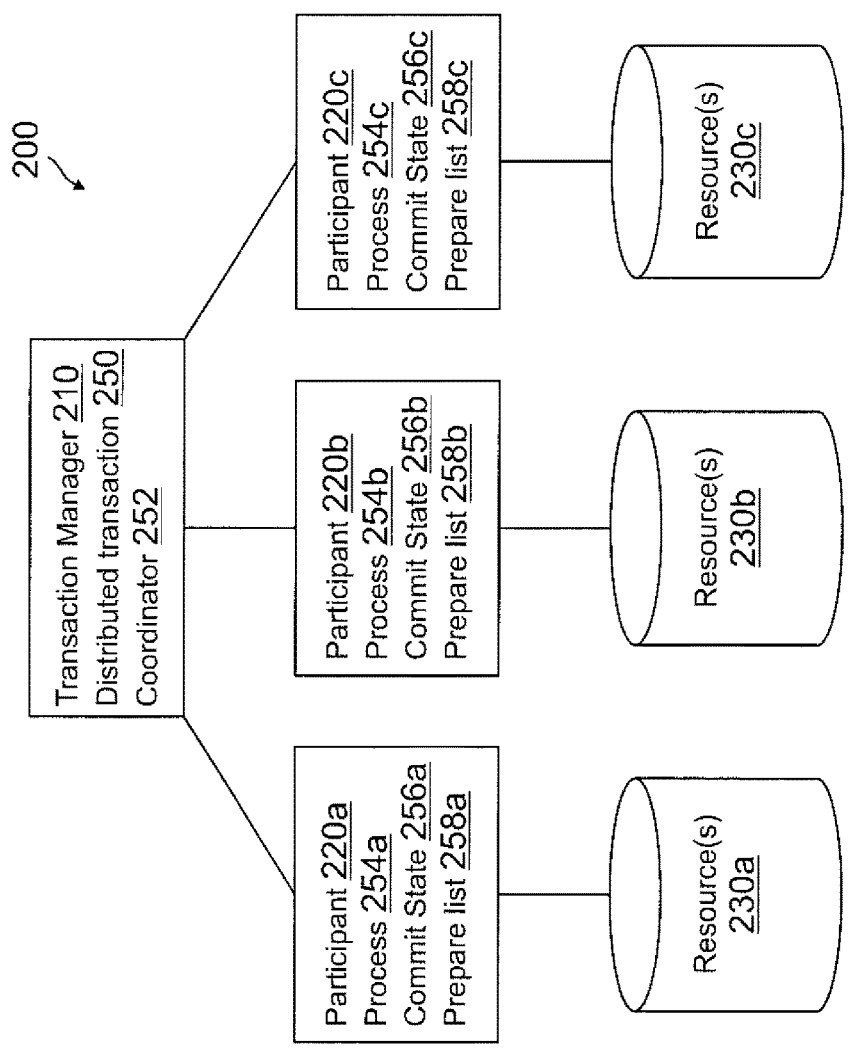
FIG. 2 is an exemplary environment illustrating network nodes having prepare lists in a transaction system, according to an embodiment.

FIG. 2 is an exemplary environment illustrating network nodes having prepare lists in a transaction system, according to an embodiment. FIG. 2 includes a transaction manager 210 corresponding generally to transaction manager 210 of FIG. 1. Additionally, resource(s) 230a, 230b, and 230c correspond generally to resource 130 of FIG. 1.

System environment 200 correspond generally to a distributed transaction processing system that uses a two-phase commit protocol (2PC) to process the distributed transaction. Thus, as previously discussed, transaction manager 210 receives a distributed transaction 250 having a plurality of processes that require the use of resource(s) 230a, 230b, and 230c. For example, distributed transaction 250 may require updates to databases corresponding to resource(s) 230a, 230b, and 230c, such as a financial transaction for an item or service (e.g., a sale of a plane ticket, a wire transfer with a resulting good shipped, etc.). In order to process distributed transaction 250, transaction manager 210 may establish a coordinator 252.

Coordinator 252 establishes participants 220a, 220b, and 220c that individually each execute process 254a, 254b, and 254c, respectively, as shown in FIG. 2. Process 254a, 254b, and 254c correspond to processes from distributed transaction 250. Participants 220a, 220b, and 220c also each have a corresponding commit state 256a, 256b, and 256c and prepare list 258a, 258b, and 258c. Commit state 256a, 256b, and 256c each correspond to a commit state of their respective participant 220a, 220b, and 220c. Thus, if participant 220a is ready to commit, commit state 256a for participant 220a will correspond to a "ready to commit" state. As previously discussed, this may correspond to a state where participant 220a has executed process 254a up to the point that participant 220a is ready to permanently change resource(s) 230a so the changes survive failure (are durable). However, if participant 220a is not ready to commit or fails, commit state 256a will not have a ready to commit state and transaction manager 210 may either rollback distributed transaction 250 or may wait for participant 220a to arrive at a ready to commit state. The same may be true for participant 220b with commit state 256b and participant 220c with commit state 256c. Thus, commit state 256b and commit state 256c may include a ready to commit state, a not ready to commit (e.g., still preparing/executing the respective process 254b and 254c), or a failed state.

In addition, participant 220a, 220b, and 220c include a prepare list 258a, 258b, and 258c, respectively. Prepare list 258a, 258b, and 258c include a list of the previous participant and the participants commit state. If participant 220a is the first participant prepared by transaction manager 210, than prepare list 258a may include no other participant information (e.g., participant 220a is the $1^{st}$ or 0 order participant). When participant 220b is prepared second, after participant 220a, prepare list 258b includes information of participant 220a and/or commit state 256a of participant 220a. Once transaction manager 210 prepares participants 220c after participant 220a and participant 220b, prepare list 258c of participant 220c include information of participant 220a having commit state 256a and participant 220b having commit state 256b. FIG. 2 displays three participants 220a, 220b, and 220c by way of example. Thus, transaction manager 210 may prepare N participants, where the prepare list of the Nth participants includes all information of the 0 through N-1 participants.

Figure 3:
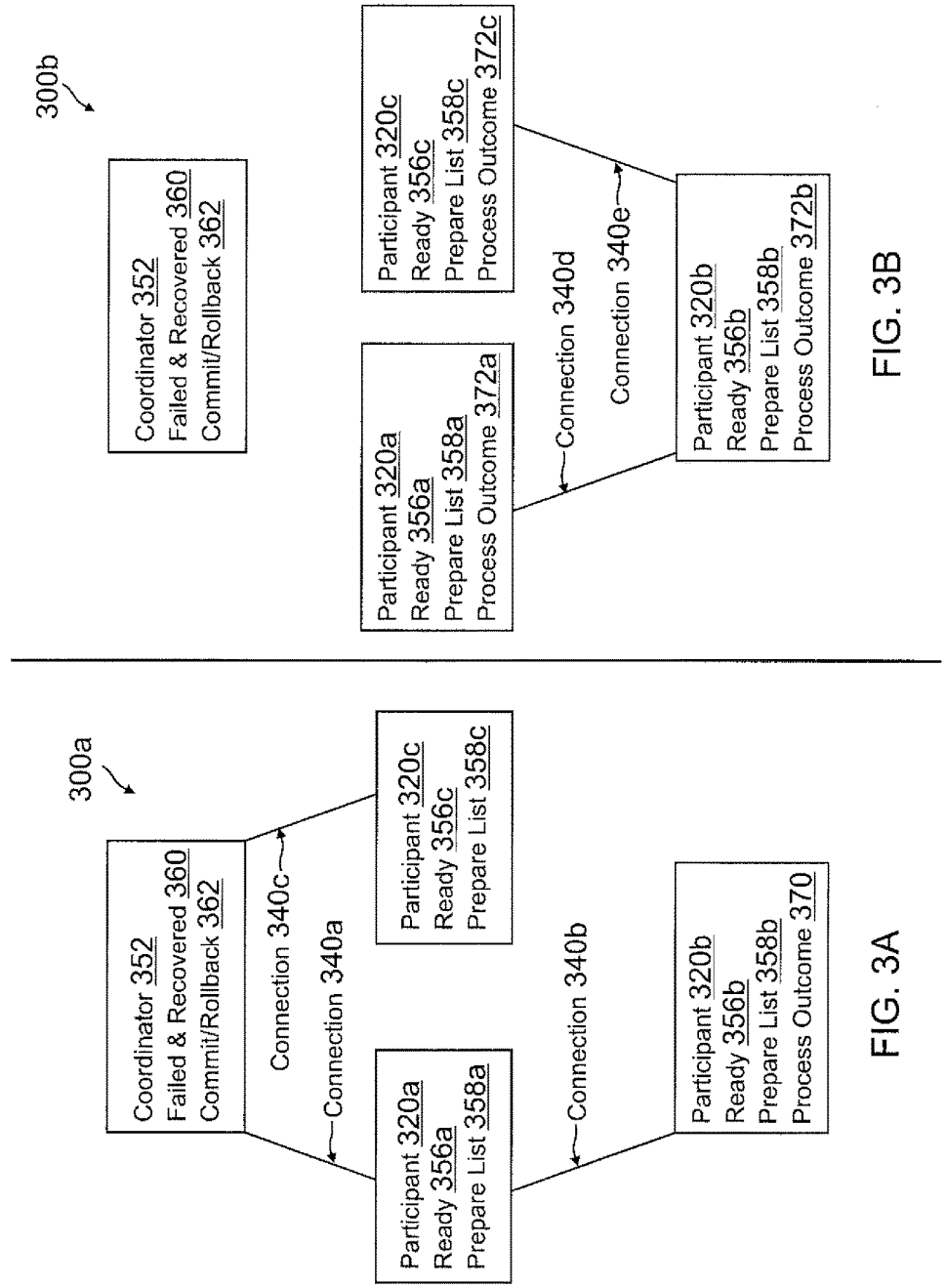
FIG. 3A is a simplified block diagram of participants in a transaction system using a two-phase commit protocol determining whether to commit using a prepare list, according to an embodiment.
FIG. 3B is a simplified block diagram of participants in a transaction system using a two-phase commit protocol determining whether to commit using a prepare list, according to an embodiment.

In the event of no failure, once commit state 256c is ready to commit, transaction manager 210 may information participant 220a, 220b, and 220c that each participant may commit their respective process 254a, 254b, and 254c from distributed transaction 250. However, in the event of failure, participants 220a, 220b, and 220c may contact each other to determine the commit state of the other participants and whether to commit or rollback. FIGS. 3A and 3B display environments including a failure of transaction manager 210 and/or coordinator 252.

FIG. 3A is a simplified block diagram of participants in a transaction system using a two-phase commit protocol determining whether to commit using a prepare list, according to an embodiment. FIG. 3A includes a coordinator 352 and participants 320a, 320b, and 320c corresponding generally to coordinator 252 and participants 320a, 320b, and 320c, respectively, of FIG. 2. Additionally, participants 320a, 320b, and 320c include prepare list 358a, 358b, and 358c corresponding generally to prepare list 258a, 258b, and 258c, respectively, of FIG. 2.

Coordinator 352 of FIG. 3A has failed in environment 300a, as shown by failed and recovered 360. During recovery, coordinator 352 may not be accessible by participant 320h, as shown by no connection between coordinator 352 and participant 320b. As shown in FIG. 3A, participants 320a, 320b, and 320c include a ready 356a, 356b, and 356c, respectively, corresponding to a ready to commit state. Thus, using ready 356a, 356b, and 356c, each of participants 320a, 320b, and 320c are ready to commit their respective processes.

Coordinator 352 may determine commit/rollback 362, corresponding to a command to commit or rollback the processes executed by participant 320a, 320b, and 320c using prepare list 358c accessed over connection 340a. Since prepare list 358c includes information of all participants 320a, 320b, and 320c, coordinator can issue a commit command using prepare list 358c as commit/rollback 362. The commit command may be received by participant 320a over connection 340a. Additionally, participant 320c may receive the command over connection 340a.

However, since participant 320b and coordinator 352 are not in contact, participant 320b would not normally receive a command to commit. In other 2PC protocol systems, participant 320b would be viewed as a failed participant or coordinator 352 may wait for participant 320b to establish contact before issuing a commit command. Thus, coordinator 352 may not issue the command without prepare list 358c. However, participant 320b may utilize prepare list 358b to contact participant 320a over connection 340b to inquire as to the outcome of the distributed transaction processing. Participant 320b may receive the commit command from participant 320a over connection 340b. Participant 320b may therefore commit the process of participant 320b. Since participant 320b does not have contact with coordinator 352, participant 320b may store process outcome 370. Process outcome 370 may include information of the execute process(es), the executed process(es) results, and the changes to one or more resources as a result of the executed process(es). Process outcome 370 may be communicated to coordinator 352 to insure knowledge of atomicity of the transaction.

FIG. 3B is a simplified block diagram of participants in a transaction system using a two-phase commit protocol determining whether to commit using a prepare list, according to an embodiment. FIG. 3a includes a coordinator 352 and participants 320a, 320b, and 320c corresponding generally to coordinator 252 and participants 320a, 320b, and 320c, respectively, of FIG. 2. Additionally, participants 320a, 320b, and 320c include prepare list 358a, 358b, and 358c corresponding generally to prepare list 258a, 258b, and 258c, respectively, of FIG. 2.

As shown in FIG. 3B, coordinator 352 is not in contact with any of participants 320a, 320b, and 320c. However, participant 320a is in contact with participant 320b using connection 340d while participant 320b is in contact with participant 320c using connection 340e. Similarly, each participant 320a, 320b, and 320c includes a prepare list 358a, 358b, and 358c, respectively, enabling connections 320d and 340e.

Since coordinator 352 is not in contact with any participant 320a, 320b, and 320c, when coordinator 352 has failed and recovered state 360, commit/rollback state 362 may either wait to connect to one or participants 320a, 320b, and 320c, or issue a failed and rollback command for immediate execution when contacting one or participants 320a, 320b, and 320c. Once coordinator 352 establishes contact with at least one of participants 320a, 320b, and/or 320c, each of participants 320a, 320b, and 320c may receive the command.

Participants 320a, 320b, and 320c may each choose to heuristically commit based on ready 356a, 356b, and 356c since they are in contact using prepare list 358a, 358b, and 358c. If each of participants 320a, 320b, and 320c choose to commit, participants 320a, 320b, and 320c may record process outcome 372a, 372b, and 372c. Process outcome 372a, 372b, and 372c include information of the execute process(es), the executed process(es) results, and the changes to one or more resources as a result of the executed process(es).

Figure 4:
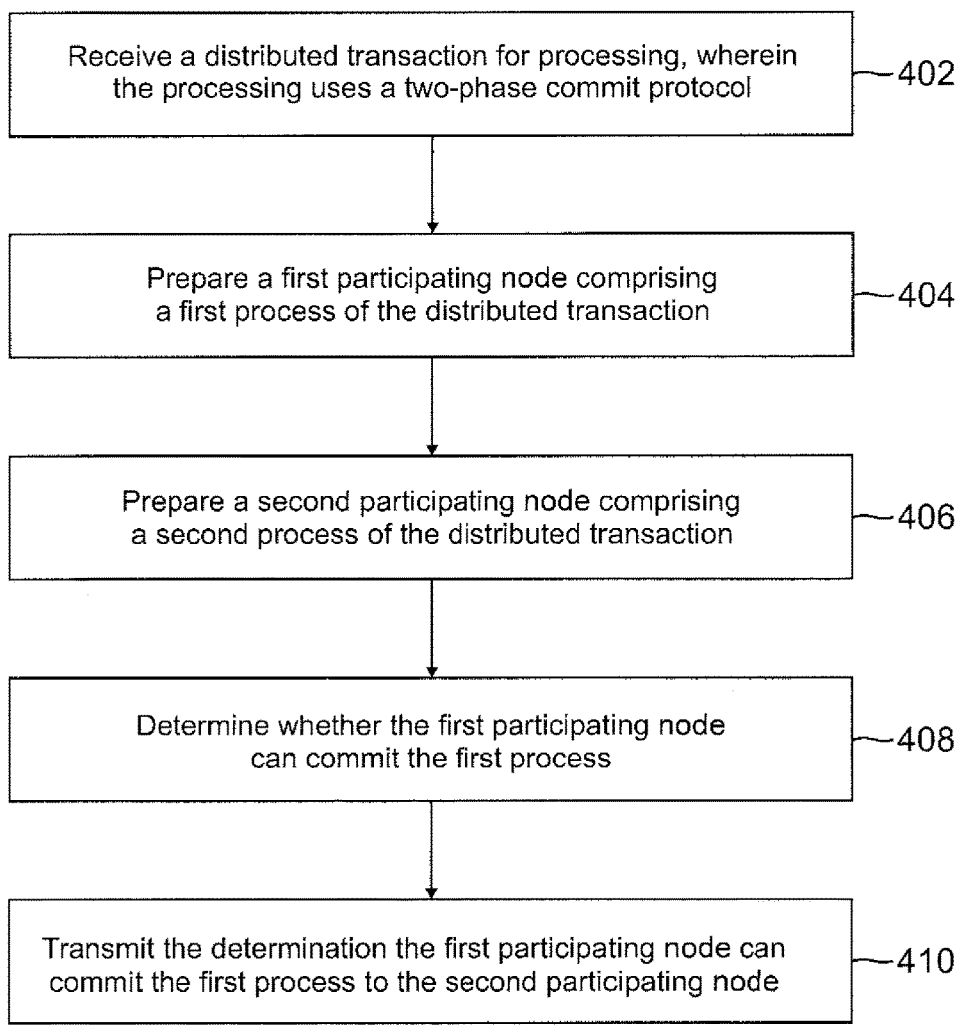
FIG. 4 is an exemplary flowchart illustrating a method of prepare list communication to participants in a two-phase commit protocol transaction processing, according to an embodiment.

FIG. 4 is an exemplary flowchart illustrating a method of prepare list communication to participants in a two-phase commit protocol transaction processing, according to an embodiment. Note that one or more steps, processes, and methods described herein may be omitted, performed in a different sequence, or combined as desired or appropriate.

At step 402, a distributed transaction is received for processing, wherein the processing uses a two-phase commit protocol. The distributed transaction may include a plurality of processes for execution using a plurality of resources. Thus, a coordinator network node/host may determine participant network nodes/hosts that may complete processes on the resources.

Using the distributed transaction, a first participating node comprising a first process of the distributed transaction is prepared, at step 404. Additionally, a second participating node comprising a second process of the distributed transaction is prepared, at step 406. Once the first participating node is prepared, a determination of whether the first participating node can commit the first process is made, at step 408.

At step 410, the determination the first participating node can commit the first process is transmitted to the second participating node. The second participating node may retain the determination, for example, for a set period of time, until the distributed transaction complete, or until the first participating node and the second participating node release a corresponding resource.

The determination the first participating node can commit may comprise querying the first participating node for a commit state of the first participating node. The commit state may comprise a ready to commit or a failure state, where the determination may use the ready to commit state.

The method may further including preparing a plurality of participating node comprising a plurality of processes of the distributed transaction, wherein the first participating node and the second participating node correspond to the plurality of participating nodes. Thus, the method may further include determining each of the plurality of participating nodes can commit, where the determining further transmits a determination a previous one of the plurality of participating nodes can commit to a subsequent one of the plurality of participating nodes during the determination the subsequent one of the plurality of participating nodes can commit. The determining may be done sequentially based on a list of processes determined from the distributed transaction.

The first participating node and the second participating node may determine a coordinator of the distributed transaction has failed, where the second participating node uses the determination the first participating node can commit to query the first participating node for a transaction outcome. In various embodiments, once the coordinator has recover, at the first participating node may transmit the determination to the coordinator and the second participating nodes may transmit the determination and a commit state comprising a ready to commit state or a failure state to the coordinator.

Figure 5:
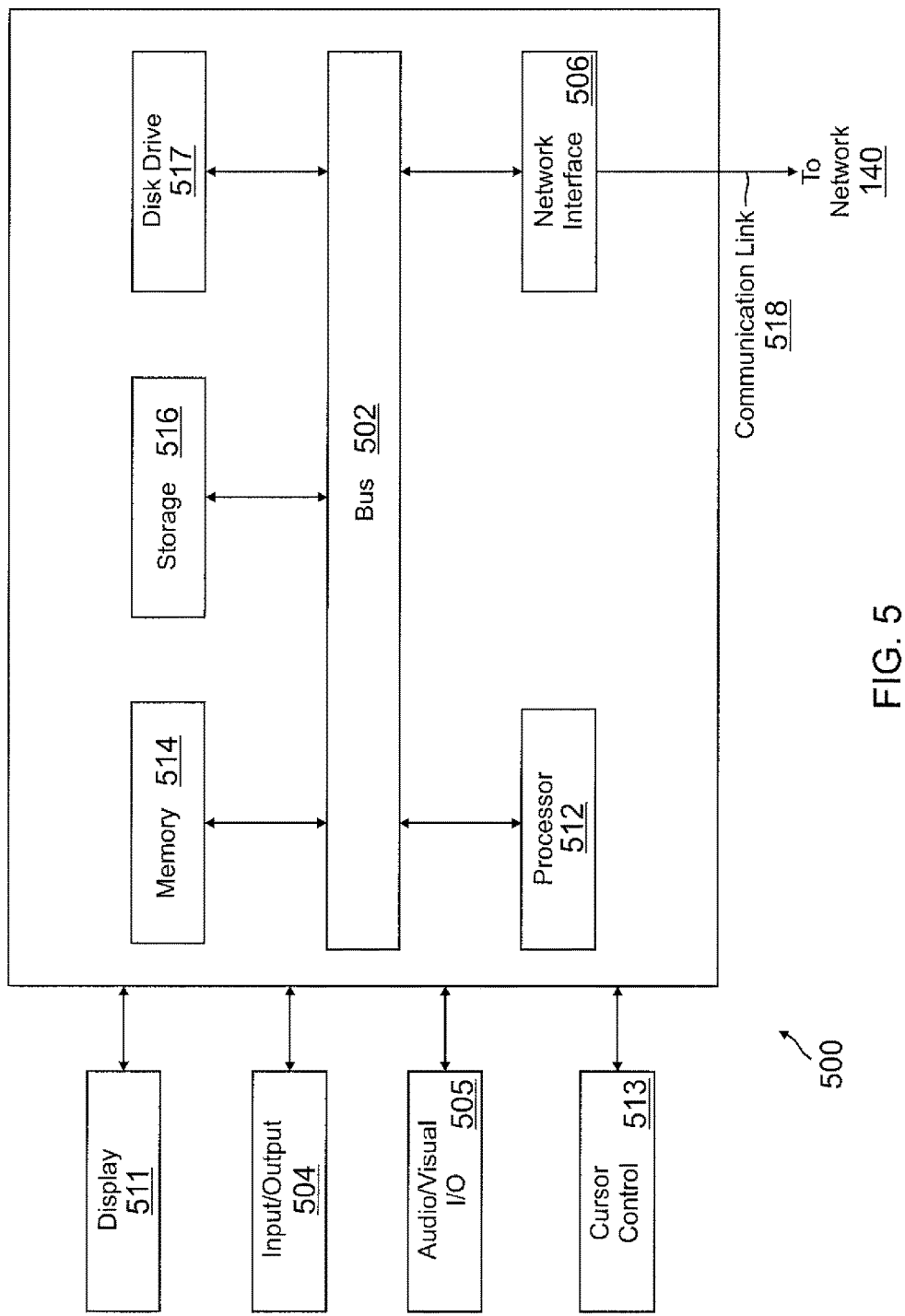
FIG. 5 is a simplified block diagram of a computer system suitable for implementing one or more embodiments of the present disclosure.

FIG. 5 is a block diagram of a computer system 500 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another endpoint, a merchant server, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method for distributed transaction processing, the method comprising:
   receiving, by a transaction coordinator node, a distributed transaction for processing, wherein the processing uses a two-phase commit protocol;
   preparing a first participating node comprising a first process of the distributed transaction;
   determining that the first participating node has prepared the first process for a commit phase, wherein the determining that the first participating node has prepared the first process comprises determining that the first participating node is in a prepare phase and has not failed, and wherein the prepare phase occurs prior to the commit phase that commits processes of the distributed transaction;
   generating, by the transaction coordinator node, a prepare list comprising a first determination that the first participating node has prepared the first process;
   preparing a second participating node comprising a second process of the distributed transaction, wherein the preparing the second participating node comprises transmitting, using one or more hardware processors, the prepare list comprising the first determination that the first participating node can commit the first process to the second participating node, wherein the second participating node stores the prepare list separate from the transaction coordinator node;
   determining that the second participating node has prepared the second process for the commit phase, wherein the determining that the second participating node has prepared the second process comprises determining that the second participating node is in the prepare phase and has not failed;
   updating, on the transaction coordinator node, the prepare list with a second determination that the second participating node has prepared the second process;
   preparing a third participating node comprising a third process of the distributed transaction, wherein the preparing the third participating node comprises transmitting the updated prepare list to the third participating node; and
   in response to recovering after system failure of the transaction coordinator node, querying each of the first participating node, the second participating node, and the third participating node for a commit state of the distributed transaction, wherein the first participating node heuristically commits or rolls back the first process during the system failure, wherein the second participating node commits or rolls back the second process based on the first participating node using the prepare list stored to the second participating node without instruction from the transaction coordinator node during the system failure, and wherein the third participating node commits or rolls back the third process based on the first participating node and the second participating node using the updated prepare list stored to the third participating node without instruction from the transaction coordinator node during the system failure;
   determining an outcome of the distributed transaction based on the commit state; and
   communicating the outcome to each of the first participating node, the second participating node, and the third participating node after recovering from the system failure.

2. The method of claim 1, wherein the second participating node retains the prepare list after failure of the transaction coordinator node.

3. The method of claim 2, wherein the prepare list is retained for one of a set period of time, until the distributed transaction completes, and until the first participating node and the second participating node release a corresponding resource.

4. The method of claim 1, wherein the first determining that the first participating node has prepared the first process comprises querying the first participating node for a prepare state of the first participating node.

5. The method of claim 4, wherein the prepare state comprises a ready to commit state or a failure state in the prepare phase, and wherein the determining that the first participating node has prepared the first process uses the ready to commit state.

6. The method of claim 1 further comprising:
   preparing a plurality of participating nodes for the processes of the distributed transaction, wherein the first participating node, the second participating node, and the third participating node correspond to the plurality of participating nodes;
   determining that each of the plurality of participating nodes can commit, wherein the determining further transmits the prepare list further comprising an additional determination that a previous one of the plurality of participating nodes can commit to a subsequent one of the plurality of participating nodes.

7. The method of claim 6, wherein the determining that the each of the plurality of participating nodes can commit comprises sequentially determining the each of the plurality of processes can commit.

8. The method of claim 7, wherein the sequentially determining uses a list of the processes determined from the distributed transaction.

9. The method of claim 1, wherein the second participating node determines that the transaction coordinator node of the distributed transaction has failed, and wherein the second participating node uses the prepare list to query the first participating node for a transaction outcome.

10. The method of claim 1, wherein the second participating node determines that the transaction coordinator node of the distributed transaction has failed and recovered, and wherein the second participating node transmits the commit process or a rollback process heuristically performed in the commit phase without the transaction coordinator node during the system failure to the transaction coordinator node.

11. A system for distributed transaction processing, the system comprising:
at least one hardware processor configured to execute a coordinator network node that receives a distributed transaction for processing, wherein the processing uses a two-phase commit protocol;
a first participating network node coupled to the coordinator network node that determines that the first participating network node has prepared a first process of the distributed transaction for a commit phase, wherein the first participating network node determines that the first participating network node has prepared the first process by determining that the first participating network node is in a prepare phase and has not failed, and wherein the prepare phase occurs prior to the commit phase that commits processes of the distributed transaction, and transmits a first determination that the first participating network node can commit the first process;
wherein the coordinator network node generates a prepare list comprising a first determination that the first participating network node can commit the first process;
a second participating network node coupled to the coordinator network node that receives the prepare list during a request to prepare a second process, stores the prepare list separate from the coordinator network node, determines that the second participating network node has prepared the second process for the commit phase, wherein the second participating network node determines that the second participating network node has prepared the second process by determining that the second participating network node is in the prepare phase and has not failed, and transmits a second determination that the second participating network node has prepared the second process;
a third participating network node coupled to the coordinator network node and comprising a third process of the distributed transaction receives an updated prepare list and stored the updated prepare list separate from the coordinator network node; and
wherein the coordinator network node updates the prepare list with the second determination that the second participating network node can commit the second process, and, in response to recovering after system failure of the network node, queries each of the first participating network node, the second participating network node, and the third participating network node for a commit state of the distributed transaction, wherein the first participating network node heuristically commits or rolls back the first process during the system failure, wherein the second participating network node commits or rolls back the second process based on the first participating network node using the prepare list stored to the second participating network node without instruction from the network node during the system failure, and wherein the third participating network node commits or rolls back the third process based on the first participating network node and the second participating network node using the updated prepare list stored to the third participating network node without instruction from the network node during the system failure, determines an outcome of the distributed transaction based on the commit state, and communicates the outcome to each of the first participating network node, the second participating network node, and the third participating network node after recovering from the system failure.

12. The system of claim 11, wherein the second participating network node retains the prepare list for one of a set period of time, until the distributed transaction completes, and until the first participating network node and the second participating network node release a corresponding resource.

13. The system of claim 11, wherein the coordinator network node receives the first determination that the first participating network node has prepared the first process by querying the first participating network node for a prepare state of the first participating network node.

14. The system of claim 13, where the prepare state comprises a ready to commit state or a failure state in the prepare phase, and wherein the first determination that the first participating network node has prepared the first process uses the ready to commit state.

15. The system of claim 11 further comprising:
a plurality of participating network nodes for the processes of the distributed transaction, wherein the first participating network node, the second participating network node, and the third participating network node correspond to the plurality of participating network nodes, wherein each of the plurality of participating network nodes determines that the each of the plurality of participating network nodes can commit, wherein the each of the plurality of participating network nodes receives the prepare list further comprising an additional determination that a previous one of the plurality of participating network nodes can commit prior to the each of the plurality of participating network nodes determining whether the each of the plurality of participating network nodes can commit.

16. The system of claim 15, wherein the coordinator network node determines that the each of the plurality of participating network nodes can commit by sequentially determining whether the each of the plurality of processes can commit.

17. The system of claim 16, wherein the plurality of participating network nodes sequentially determines the each of the plurality of participating network nodes can commit using a list of processes determined from the distributed transaction.

18. The system of claim 11, wherein the second participating network node determines that the coordinator network node of the distributed transaction has failed, and wherein the second participating network node uses the prepare list to query the first participating network node for a transaction outcome.

19. A non-transitory computer readable medium comprising a plurality of machine-readable instructions which when executed by one or more processors of a server are adapted to cause the server to perform a method comprising:
receiving, by a transaction coordinator node, a distributed transaction for processing, wherein the processing uses a two-phase commit protocol;
preparing a first participating node comprising a first process of the distributed transaction;
determining that the first participating node has prepared the first process for a commit phase, wherein the determining that the first participating node has prepared the first process comprises determining that the first participating node is in a prepare phase and has not failed, and wherein the prepare phase occurs prior to the commit phase that commits processes of the distributed transaction;

generating, by the transaction coordinator node, a prepare list comprising a first determination that the first participating node has prepared the first process;

preparing a second participating node comprising a second process of the distributed transaction, wherein the preparing the second participating node comprises transmitting the prepare list comprising the first determination that the first participating node can commit the first process to the second participating node, wherein the second participating node stores the prepare list separate from the transaction coordinator node;

determining that the second participating node has prepared the second process for the commit phase, wherein the determining that the second participating node has prepared the second process comprises determining that the second participating node is in the prepare phase and has not failed;

updating, on the transaction coordinator node, the prepare list with a second determination that the second participating node has prepared the second process;

preparing a third participating node comprising a third process of the distributed transaction, wherein the preparing the third participating node comprises transmitting the updated prepare list to the third participating node; and in response to recovering after system failure of the transaction coordinator node, querying each of the first participating node, the second participating node, and the third participating node for a commit state of the distributed transaction, wherein the first participating node heuristically commits or rolls back the first process during the system failure, wherein the second participating node commits or rolls back the second process based on the first participating node using the prepare list stored to the second participating node without instruction from the transaction coordinator node during the system failure, and wherein the third participating node commits or rolls back the third process based on the first participating node and the second participating node using the updated prepare list stored to the third participating node without instruction from the transaction coordinator node during the system failure;

determining an outcome of the distributed transaction based on the commit state; and communicating the outcome to each of the first participating node, the second participating node, and the third participating node after recovering from the system failure.

20. The non-transitory computer readable medium of claim 19, wherein the second participating node retains the prepare list for one of a set period of time, until the distributed transaction completes, and until the first participating node and the second participating node release a corresponding resource.

* * * * *

UNITED STATES PATENT AND TRADEMARK OFFICE
CERTIFICATE OF CORRECTION

PATENT NO. : 10,203,981 B2  
APPLICATION NO. : 14/193802  
DATED : February 12, 2019  
INVENTOR(S) : Mark Little Page 1 of 1

It is certified that error appears in the above-identified patent and that said Letters Patent is hereby corrected as shown below:

In the Specification

In Column 9, Line 45, change "320h" to --320b--.

Signed and Sealed this
Twenty-ninth Day of October, 2019

Andrei Iancu
*Director of the United States Patent and Trademark Office*